Jan. 1, 1952 R. H. RANGER 2,580,462
RADIO RANGE DEVICE

Filed Dec. 9, 1943 4 Sheets-Sheet 1

INVENTOR
RICHARD H. RANGER
BY William D Hall
ATTORNEYS

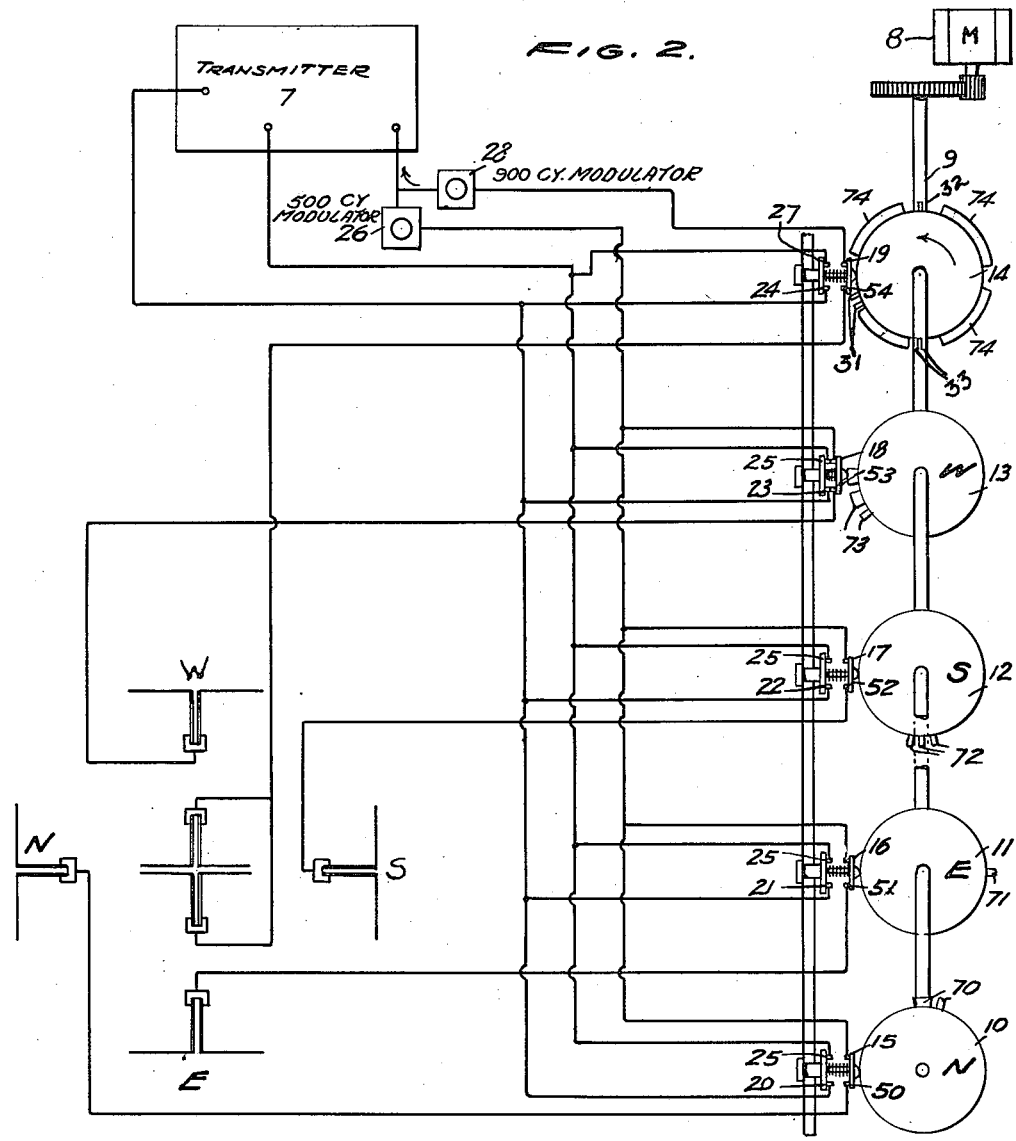

Jan. 1, 1952  R. H. RANGER  2,580,462
RADIO RANGE DEVICE
Filed Dec. 9, 1943  4 Sheets-Sheet 3

INVENTOR
RICHARD H. RANGER
BY William D. Hall
ATTORNEY

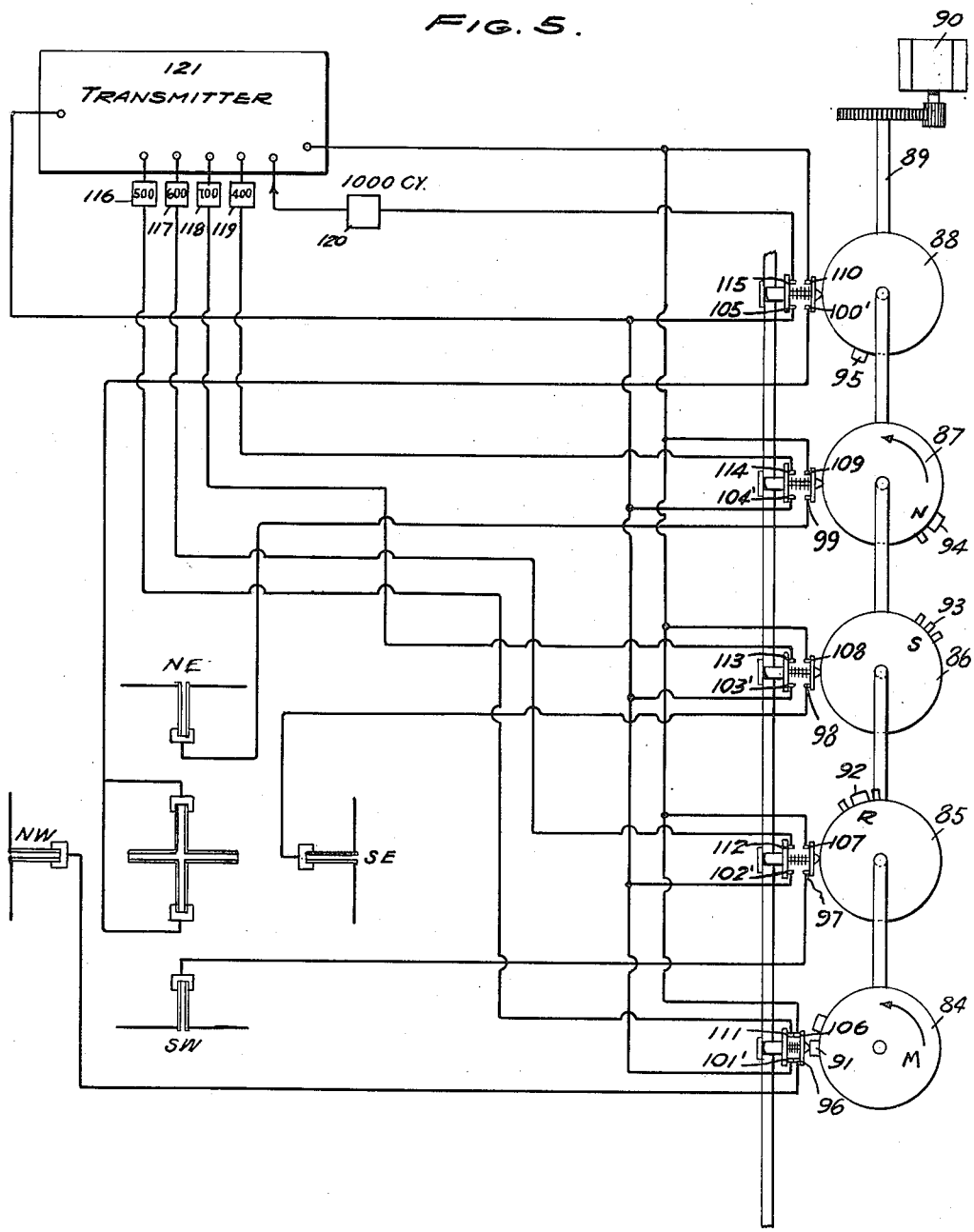

Patented Jan. 1, 1952

2,580,462

UNITED STATES PATENT OFFICE 2,580,462

RADIO RANGE DEVICE

Richard H. Ranger, United States Army

Application December 9, 1943, Serial No. 513,614

7 Claims. (Cl. 343—107)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in radio range devices for directing aircraft pilots.

In certain military aircraft stations a searchlight beacon directed vertically upward is used as a locator beacon around which friendly fighters orbit awaiting enemy attack. Such a beacon obviously reveals the location visually to the enemy.

It is, therefore, an object of this invention to provide a radio beacon for directing friendly aircraft without revealing the location visually to the enemy.

In accordance with the invention five directional antennas are used, one of which provides a central vertical cone for directing signals upwards and the other four antennas are arranged at cardinal points of the compass and tilted slightly outwardly and upwardly. Signals coded to indicate the antenna in operation are sent out in succession from the north, east, south and west antennas. During the intervals between the signals from the four antennas, signals are sent up from the center antenna. By noting the strength and the code of the signals, a pilot is accurately directed to the location.

A further object is to provide a system for enabling a pilot to readily locate himself over a large area of many thousands of square miles. In carrying out this object, the area is divided into a grid pattern of squares fifty miles to a side, each square being designated, for example, by a letter. Radio range devices are positioned at definite points in each square and send out definite signals to indicate each square. By noting the information furnished by the signals, a pilot can readily locate himself.

These and other objects are attained by the structure and arrangement of parts hereinafter described and illustrated in the accompanying drawings, forming a part hereof, and in which:

Fig. 2 is a schematic diagram of the circuit arrangement.

Fig. 3 is an enlarged view of one form of switch which can be used in the device.

Fig. 5 is a schematic diagram for a circuit arrangement for the modified form.

Figure 1:
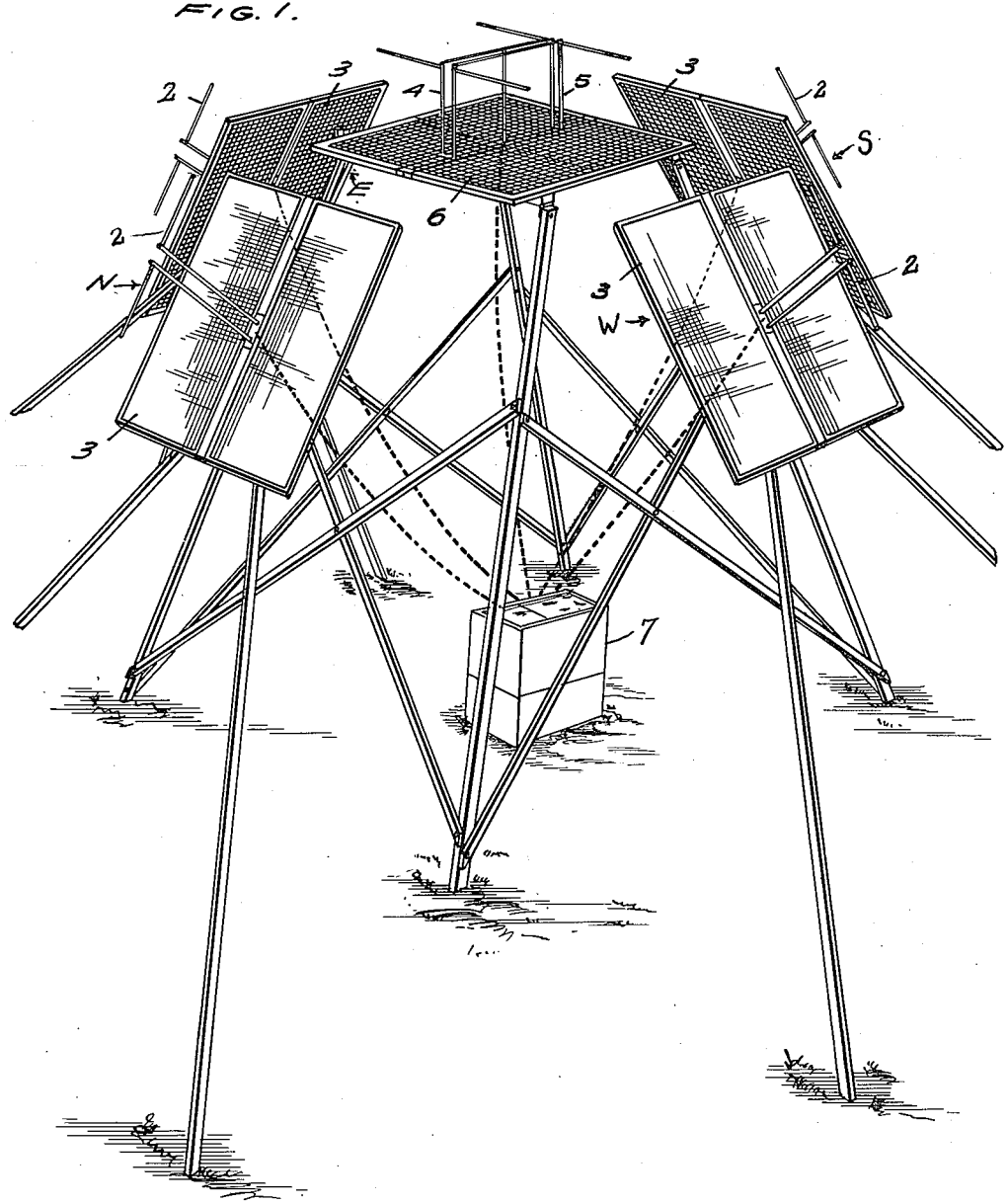
Fig. 1 is a perspective view of the radio range device showing the arrangement of the antennas.

Referring to the drawings, in Fig. 1 there are shown four antennas N, E, S, and W, arranged respectively at the north, east, south, and west points of the compass. Each antenna preferably comprises a single dipole 2 mounted about one quarter wavelength above a screened reflector 3, which structure has been found to give the right pattern for the side lobe antennas. The directional axes of the antennas N, E, S, and W are tilted slightly out and upward. For the center cone, two dipoles 4 and 5, with a screened reflector 6, are used. The center cone antenna directs signals upwardly on a vertical axis.

The keying of signals to these antennas is accomplished by switching the antennas sequentially to the transmitter 7 through respective code cam switch devices and modulators; tone modulations being constantly in operation. A motor-driven cam contactor transfers the low power radio output from a very high frequency transmitter 7 to each of the antennas in a definite order. The transmitter energy is fed for example, first to the north leaning antenna at intervals to correspond to the dash-dot Morse code transmission of the letter "N." After this signal has been sent out the transmitter energy is fed to the center antenna, which sends a signal vertically upwards. The signal from the center antenna is substantially a spacing pulse or long dash between the letter signals. The signal from the center antenna is immediately followed by an "E" code signal transmitted from the east antenna, after which the center antenna is again connected to the transmitter. This is followed by an "S" code signal transmitted from the south antenna, followed by a signal from the center antenna, and then a "W" code signal transmitted from the west antenna, followed by a signal from the center antenna.

In practical tests, pilots have experienced no difficulty in knowing which direction they should fly to come into the orbiting circle with this apparatus. If the pilot is south of the circle, an "S" signal is received and the pilot flies north to reach the circle. If the pilot is not directly south, he will come to a section line by flying north. Assume he reaches the intersection between south and east. As soon as the "E" signal is received as well as the "S" the pilot will know he is on the south-east boundary, and immediately makes a bank to bring him to north-west and he follows this course until he reaches the circle.

The spacing wave for the center vertical signal is set at a higher audible interrupted continuous wave frequency than is employed for the four quadrant antennas. About 900 cycles are used for the center signal, and about 500 cycles for the antennas N, S, E, and W. This makes it possible for an approaching pilot to identify the center signal by its pitch. As soon as he hears the center signal build up, he makes a right turn and feels his way back and forth, left and right to maintain equal intensity between the spacing wave and the various quadrant signals as he proceeds around the circle.

Figure 2 shows schematically an arrangement for automatically connecting the several antennas to the transmitter. In the figure is shown a motor 8 having a countershaft 9, upon which is mounted five cam wheels 10, 11, 12, 13, and 14, which are arranged to engage respectively switch elements 15, 16, 17, 18, and 19, carrying contacts 50, 51, 52, 53, and 54, respectively connected to the north, east, south, west and center antennas. The contacts 50, 51, 52, 53, and 54 are arranged to engage opposed contacts 20, 21, 22, 23, 24 which are all connected to the output of the transmitter, 7. Contacts 20, 21, 22, 23 connect the respective antennas to the transmitter to radiate the carrier frequency, modulated for example by 500 cycles, while contact 24 connects the center antenna to radiate the carrier frequency modulated by 900 cycles.

Each switch element comprises a throw member including a head 61 (see Figure 3) integral with a short plunger 62, which is encircled by a compression spring 63 bearing against the head 61 and a flange 64 on a tube 65 in which the plunger is slidably positioned. The head carries a pair of insulated spaced contacts arranged to engage a pair of insulated contacts on the flange, the contacts normally being maintained out of engagement by the pressure of the spring on the flange and head.

Each of the switch elements 15, 16, 17, and 18 has a pair of opposed contacts 25 at the upper side, Figure 2, which, when co-engaged, connects a modulator 26 to the transmitter to modulate the carrier frequency by a frequency, for example, of 500 cycles. Switch element 19 also has a pair of opposed contacts 27, which when engaged connects a modulator 28 to the transmitter to modulate the carrier frequency by a frequency, for example, of 900 cycles, to radiate from the center antenna.

The cam wheels 10, 11, 12, 13 are provided respectively with cams 70, 71, 72, and 73 proportioned to produce dots and dashes to indicate the letters N, E, S, and W; and the wheel 14 has four large or long dash cams 74, each of three of these extending over approximately 70 degrees in quadrature, and one being slightly shorter and having two following short cams 31 occupying the remainder of the angle of substantially 70 degrees. The heads 61 have rounded wiper protuberances 66 adapted to engage the cams to bring the contacts 25 and 20—24 into engagement to properly produce the desired signals.

The cams 74 have intervals therebetween sufficient to permit transmissions of signals by the other four cam wheels without lap of the transmitted signals, and three at least extend over an angle of approximately 75 degrees, while the fourth, within the same angle, is interrupted to provide a signal characterizing the station.

In operation, referring to Figure 2, the shaft 9 is rotated counter-clockwise, and the cam wheel 13 is shown in position for the last lobe of cam 73 to cause contacts 53 and 23 to engage and connect the west antenna to the transmitter. At the same time the opposed contacts 25 on the switch element are closed to connect the modulator 26 to the transmitter to modulate the carrier frequency by 500 cycles. As the wheel 13 then continues to rotate, the cam 73 will have intermittently closed the circuits to produce the Morse code signal for the letter "W," dot and two dashes. As the shaft 9 continues to rotate, and the code signal for "W" is completed, wheel 14 is in position for one of its cams 74 to engage switch element 19 and cause co-engagement of contacts 54 and 24 and mutual engagement of the contacts 27. This connects the center antenna to the transmitter and also connects modulator 28 to the transmitter to modulate the carrier frequency by 900 cycles. A sustained signal is thus radiated from the center antenna until the shaft 9 rotates sufficiently for the cam 74 to clear the switch 19 and permit the latter to interrupt the circuits. In this movement, wheel 10 is placed in position to cause cam 70 thereon to close contacts 50 and 20 and contacts 25 carried by switch element 15. The north antenna is now connected to the transmitter, and the modulator 26 is also connected to the transmitter, to cause the north antenna to radiate the code signal, a dash and a dot, for the letter "N," at the carrier frequency modulated by 500 cycles. Rotation of the shaft farther will next cause a second one of the cams 74 on wheel 14 to connect the center antenna and output from modulator 28 to radiate from the center antenna a sustained dash signal at the carrier frequency modulated by 900 cycles. Further rotation of shaft 9 brings wheel 11 into position to cause its cam 71 to close the contacts 51 and 21 and 25 on switch element 16, which connects the east antenna to the transmitter and also connects modulator 26 to the transmitter to cause the east antenna to radiate the code signal for "E," one dot, at the carrier frequency modulated by 500 cycles.

Further rotation of shaft 9 causes a third one of the cams 74 to connect the center antenna and modulator 28 to the transmitter to radiate from the center antenna a sustained signal at the carrier frequency modulated by 900 cycles. The shaft 9 now rotates to place wheel 12 in position to cause its cam 72 to cause engagement of contacts 22 and 52, and 25, to connect the south antenna and the modulator 26 to the transmitter so as to radiate from the south antenna the code signal for the letter "S," three dots, at the carrier frequency modulated by 500 cycles.

The shaft 9 then rotates farther to cause the 4th cam 74 and cams 31 to connect the center antenna as above described, producing a code signal "D" identifying the station, in the vertical beam. In the latter part of this movement, the shaft 9 will bring wheel 13 for the west antenna into the position hereinbefore described the cams 73 sending the code group "W" as before described, and the cycle is repeated.

Cam wheel 14 is provided with a pair of small cams 31 as before mentioned, a single cam 32, and another pair of cams 33. These cams are arranged on the wheel 14 in positions to engage switch element 19 to cause mutual engagement of contacts 54 and 24 and the co-engagement of contacts 27 during the intervals between dots and dashes of cams 13, 12, 11, and 10. For example, the west antenna sends out a dot and two dashes preceded by a long dash on the central antenna. During the interval between the dot and first dash cam of wheel 13, the rotation being counter-clockwise, one of the small cams 31 causes the center antenna to be connected to the transmitter and also connects modulator 28 to the transmitter to modulate the carrier frequency by 900 cycles. This signal is radiated from the center antenna until the first dash cam of wheel 13 is reached. After the first dash cam of wheel 13 has been passed the second cam 31 of wheel 14 will again cause a signal to be radiated from the center antenna as above described. The second dash cam at 73, then functions before the next cam 74 is effective, as before indicated.

Similarly, a small cam 32 of wheel 14 will cause a signal to be radiated from the center antenna during the interval between the dash and dot signals produced by the cams of wheel 10. Likewise, two small cams 33 of wheel 14 each will cause a signal to be radiated from the center antenna during the intervals between the dot signals made by cams 72 of wheel 12.

The purpose of cams 31, 32 and 33 is to generate a signal between the dots and dashes of wheels 10, 11, 12 and 13. Hence a tone of one pitch or the other will always be transmitted both manifest in equal amplitude in a generally conical zone of annular cross section, centered over the station, and the pilot (or his radio operator as the case may be) can determine when he is near the vertical axis of the antenna system when the tones from antennas 4 and another are of equal signal strength. In this way, when a craft approaches one side of the cone above mentioned, the compass direction signal will first be heard without any other signal. As the cone is neared, the last mentioned signal will be heard with a weak signal from the central vertical beam filling the intervals of the stronger signal. At a part of the cone the two signals become of equal strength and will be distinctly heard as an alternation of two notes or tones of different pitch according to the frequencies chosen at the modulators 26 and 28. Inwardly of the last mentioned part of the cone, the station identifying signal will become loudest and the compass point signal will diminish in strength with progress toward the vertical axis of the station. Possibly only the signal on the vertically projected beam will be heard near the vertical axis of the station.

The cams are arranged on the wheels so that no two cams close circuits simultaneously, and the cams on wheels 10, 11, 12, and 13 close circuits at 90 degree intervals, that is, each cam closes the circuit to correspond to the letters N, E, S, and W, once during a revolution. Cams 74 are arranged to close the circuit to the center antenna during the periods between operations of cams 70, 71, 72 and 73.

Figure 4:
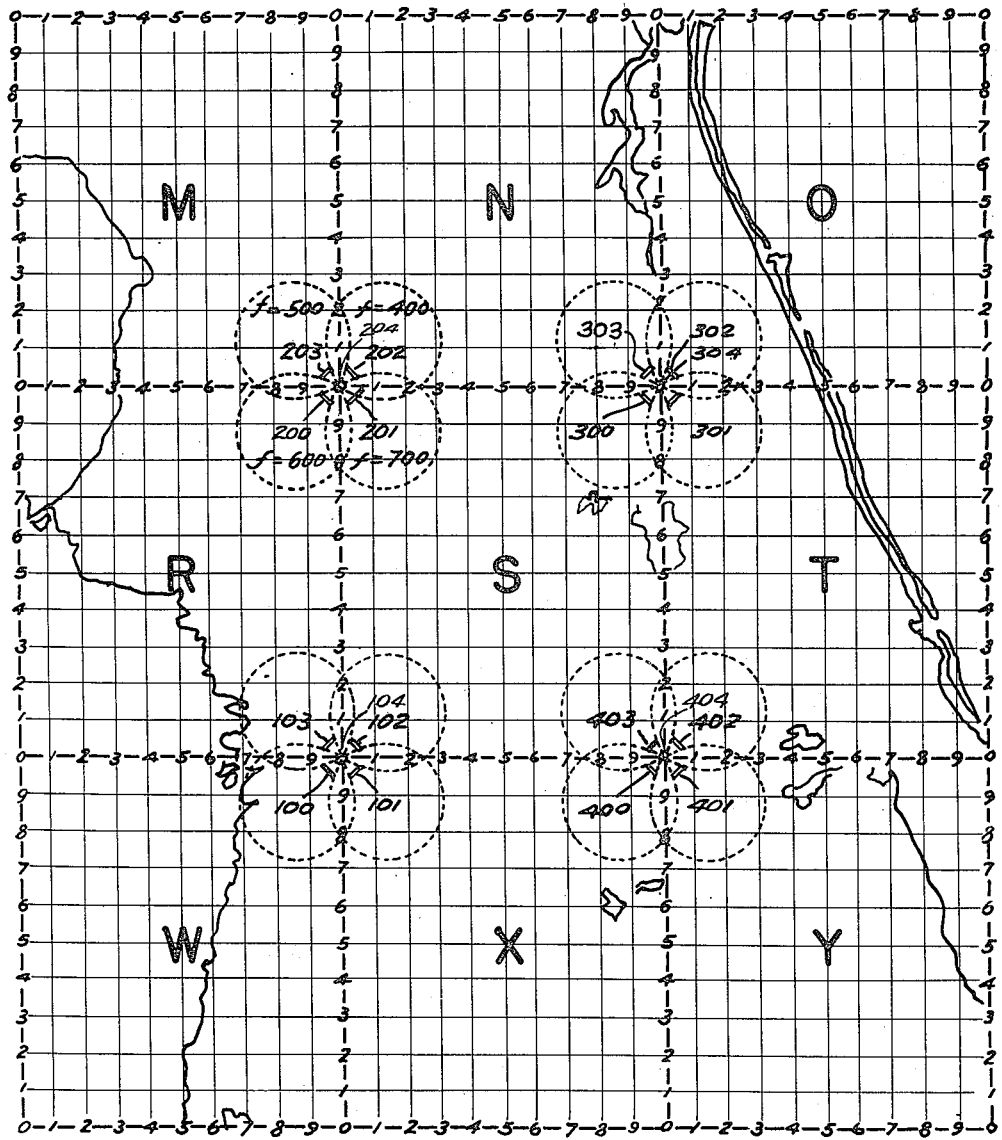
Fig. 4 is a view of a map used in the modified form of the invention.

In Figure 4 is shown a map used in a modified form of the invention for enabling a pilot to locate himself over a large area covering hundreds or thousands of square miles. In accordance with this form of the invention, the area is divided into a plurality of squares having 50 miles to each side, each square being designated by a letter or the like. At at least one corner of each square (for instance, square S in Figure 4) is mounted an orbiting signal circle station generally similar to the station above described in connection with Figures 1 and 2, but with circuits and cams modified as in Figure 5, and further as described below. The transmissions of the stations are synchronized so that they all pass the transmitting conditions from one antenna to another around the four directions at the same time. For example, referring to Figure 4, when the southeast antenna 201 at the northwest corner station 204 of square S is radiating into square S, the southeast antenna 301 at the northeast corner station 304 of square S is radiating into square T, and the southeast antennas 101 and 401 at the southwest and southeast corner stations 104 and 404 of square S are respectively radiating into squares X and Y. Hence all four antennas 101, 202, 301, and 401 are radiating in a southeast direction at the same time and at the same modulation frequency. A short interval later these antennas will cease to radiate and antennas 102, 202, 302, and 402 will be energized and will all radiate in the northeast direction at the same time and at the same modulation frequency. A short interval later these will cease to radiate and antennas 103, 203, 303, and 403 will all radiate in the northwest direction at the same modulation frequency for a time. Finally antennas 100, 200, 300, and 400 will all radiate signals toward the southwest for a time interval and at the same modulation frequencies.

In the modification shown in Figures 4 and 5, the four quadrant antennas are not oriented north, east, south, and west, but are positioned northeast, southeast, northwest and southwest. Each 50-mile square is designated by a letter as shown in Figure 4. From each station, the letter of the square being transmitted into will be given in the signal of the moment, as the transmission progresses in steps around the station, a pilot flying in that square will hear the same letter from each of the four stations, but at a different tone from each station. For example, the southeast transmission of all antennas 101, 201, 301, and 401 would be at 700 cycles, the southwest transmission of antennas 100, 200, 300, and 400 at 600 cycles; northwest transmission of antennas 103, 203, 303, and 403 at 500 cycles; northeast transmission of antennas 102, 202, 302, and 402 at 400 cycles; and the center spacing wave at 1000 cycles. With this type of indication, the pilot will be able to tell from which corner of the square he is receiving the strongest signal. By estimating the signal strengths he can then fly to the boundary he desires and then turn appropriately to accomplish his mission.

In Figure 5 is shown schematically a circuit arrangement for producing the signals for the modified form of the invention. In this arrangement cam wheels 84, 85, 86, 87, and 88 are fixed to shaft 89 of an electric motor 90. For purposes of illustration, the station at the northwest corner of square S will be considered. It will be seen that this station will radiate northwest signals into square M by antenna 203, southwest signals into square R by antenna 200, southeast signals into square S by antenna 201, and northeast signals into square N by antenna 202. Accordingly, cam wheels 84, 85, 86, and 87 are respectively provided with cams 91, 92, 93, and 94 to produce the code signals for the letters M, R, S, and N. In the figure, cam wheel 84 is shown in position to connect the northwest antenna 203 to the transmitter.

In operation, referring to Figures 5 and 4, when cam wheel 84 is in the position shown, engagement is made between contacts 96 and 101' to connect the northwest antenna to the transmitter 121, and engagement is also made between contacts 106 and 111 to connect modulator 116 to the transmitter to modulate the carrier frequency by 500 cycles. The northwest antenna will then radiate into the M square a code signal for the letter "M," two dashes, with the carrier frequency modulated by 500 cycles.

It is assumed that the shaft 89 rotates counterclockwise.

When the shaft 89 has rotated 72 degrees, cam wheel 85 is brought into position to cause cam 92 to cause the engagement of contacts 97 and 102', and contacts 107 and 112, which connects the southwest antenna to the transmitter and the modulator 117 to the transmitter to modulate the carrier frequency by 600 cycles. A code signal for the letter R, dot, dash, dot, will then be radiated into the R square at a carrier frequency modulated by 600 cycles.

Further rotation of shaft 89 by 72 degrees causes cams 93 on wheel 86 to cause engagement of contacts 98 and 103' and contacts 108 and 113, to connect the southeast antenna to the transmitter and connect modulator 118 to the transmitter to modulate the carrier frequency by 700 cycles. There will then be radiated into the S square signal for the letter "S," three dots, at the carrier frequency modulated by 700 cycles. Further rotation of shaft 89 by 72 degrees brings the wheel 87 into position to cause cam 94 to cause engagement of contacts 99 and 104' and contacts 109 and 114 to connect the northeast antenna to the transmitter and connect modulator 119 to the transmitter to radiate into the N square the code signal for the letter "N," one dash and one dot, at the carrier frequency modulated by 400 cycles. Further rotation of shaft 89 by 72 degrees brings wheel 88 into position to cause cam 95 to cause the engagement of contacts 100 and 105 and contacts 110 and 115 to connect the transmitter to the center antenna and the transmitter to the modulator 120 to cause the center antenna to radiate directly upwards a sustained signal at a carrier frequency modulated by 1000 cycles.

Further rotation of the shaft 89 by 72 degrees brings cam wheel 84 back to the position above described and the cycle is repeated.

There are four systems similar mechanically and electrically in principle to Figure 5, one at each station. All four motors 90 are synchronous motors and are all operated from the same power source. The only difference from the apparatus of Figure 5 as it is applied to the four different stations is in the cams. The differences between these four station systems will now be described. In station 204, cam 84, for antenna 203 transmits the letter "M," cam 84 on the apparatus at station 304 transmits the letter "N," cam 84 at station 404 transmits the letter "S" to antenna 403, and cam 84 at station 104 transmits the letter "R" to antenna 103. Cam 85 at station 204 transmits the letter "R" to antenna 200, cam 85 at station 304 transmits the letter "S" to antenna 300, cam 85 at station 404 transmits the letter "X" to antenna 400, and cam 85 at station 104 transmits the letter "W" to antenna 100. Cam 86 at station 204 transmits the letter "S" to antenna 201, cam 86 at station 304 transmits the letter "T" to antenna 301, cam 86 at station 404 transmits the letter "Y" to antenna 401, cam 86 at station 104 transmits the letter "X" to antenna 101. Cam 87 at station 204 transmits the letter "N" to antenna 202, cam 87 at station 304 transmits the letter "O" to antenna 302, cam 87 at station 404 transmits the letter "T" to antenna 402, and cam 87 at station 104 transmits the letter "S" to antenna 102. Cam 88 at all stations transmits a dash to the central antenna. The synchronous motors are all started at such a time that the antennas, 100, 200, 300, and 400 are all energized simultaneously, and that the other parallel antennas are all subsequently energized synchronously.

From the above description it will be seen that a pilot can readily determine in which square he is flying and locate himself by consulting his map of the territory.

The above descriptions are to be considered as illustrative and not limitative of the invention, as obviously different frequencies may be used, and the antennas arranged in different manners without departing from the scope of the invention as set forth in the appended claims.

Having described the invention what is claimed as new and desired to be protected by Letters Patent, is:

1. In a radio range system for an area divided into a plurality of squares designated by definite symbols, a radio range station at each corner of an inner one of said squares, each station comprising a center antenna including means radiating signals directly upward and four antennas surrounding the center antennas, said four antennas including means successively radiating different code signals significant of said symbols upwardly and outwardly into corresponding immediately adjacent ones of the four adjoining squares designated by said symbols.

2. A radio range system for an area divided into a plurality of rectangular terrain sections designated by respective symbols, radio range devices mounted at each corner of one central section, each of said devices having means to radiate radio waves vertically upward and means to radiate radio code signals representing said respective symbols over corresponding immediately adjacent respective squares so designated in a plurality of directions outwardly and upwardly successively and each at different audibly distinguishable frequencies.

3. A radio system for aiding navigation of an aircraft comprising a plurality of radio stations within range of each other and at points the locations of which are known to the pilot of the aircraft, each radio station including means for transmitting a directional beam of radiations with an axis having a dominant horizontal component each station including means to periodically change the axis of the beam over predetermined compass angles successively about the radio station, means to produce signals in the beam, means for changing a characteristic of the signal as the beam position is changed to thereby effect distinguishing characteristics in the beam in respective different sectors covered by respective said radiations, and means timing relatively to each other the operation of said stations to effect distinguishing characteristics in the beams from the stations in areas where signals from two or more said stations are transmitted.

4. A radio system of the nature described for aiding aircraft navigation, comprising a plurality of radio stations of known locations within effective radio transmission range of each other whereby they transmit signals into a plurality of zones about the said stations including a central zone generally central in relation to the said plurality of radio stations, each said station including means for beam transmission of respective code symbol signals in given compass zones about the station, and to transmit said code symbol signals in successive order in said compass zones at each station and in such order of station operation in said system that identical code symbol signals are transmitted into said central zone by all the said radio stations successively, means in each station for producing in said beam transmissions audio frequency tones distinct in pitch in each said compass zone of the station, means for synchronizing the transmissions of the audio frequencies while transmitted in the same compass direction, the said audio frequency tone transmitted into said central zone from each said station being distinct in pitch from the pitch of audio frequency tones transmitted into the central zone from all the other stations, and means to transmit a marker beacon coincident with the vertical axis of each said station and distinguished from all the other said transmissions.

5. In a system of the character described, a station comprising a central vertical beam transmitting antenna, a plurality of compass angle directional beam antennas radially arranged around said central antenna, a signal system for said station comprising a high frequency wave emitter, respective audio frequency modulators therefore for each antenna, a circuit from the said emitter to each of the antennas including a normally open first switch, a circuit between each said modulator and said emitter including a normally open second switch, a common throw member for said first and second switches for each antenna, all of said throw members aligned transversely and being independently movable in one direction for simultaneously closing their connected said first and second switches, a revoluble multiple wheel cam device having its axis parallel to the line of said throw members and having respective cam wheels aligned with the throw members and having cams constructed to engage and move the aligned throw members to close the respective first and second switches under rotation of the cam device, a plurality of said wheels equal to the number of said compass angle directional antennas having cams with mean positions of substantially equal angular displacement around said axis constructed to engage and operate respective said throw members successively each a distinctive number and duration of times in each rotation of the cam device, the cam wheel for the vertical beam antenna switches and throw device having cams of number equal to the number of said plurality of radially arranged antennas and having angular extents equal to respective angular intervals between the successive cams of said plurality of wheels and operative in the same order.

6. The structure of claim 5 in which one only of the cams of the wheel for the throw member operating the said switches in the circuits for the vertical beam antenna is interrupted to cause a distinctive signal operation of said switches by one of its cams, whereby signal emission will occur at the station in certain intervals between code signals from said plurality of radially arranged antennas continuous with preceding and succeeding last named signals, and a code signal significant of the station will be emitted in the remaining one of said intervals.

7. The structure of claim 6 in which the cams on said plurality of wheels are articulated to produce distinct code signals at respective antennas, and the last named wheel is formed additionally with cam projections in number the same as, and at angular positions the same as, the intervals of articulations in the cam parts of the said plurality of wheels, whereby pulses will be radiated from the center antenna in phase with interruptions within code signals from the other antennas.

RICHARD H. RANGER.

REFERENCES CITED

The following references are of record in the file of this patent:

UNITED STATES PATENTS

| Number | Name | Date |
|---|---|---|
| 1,802,688 | Wallace | Apr. 28, 1931 |
| 1,820,004 | Kruesi | Aug. 18, 1931 |
| 1,885,023 | Dieckmann | Oct. 25, 1932 |
| 1,990,977 | Cawley | Feb. 12, 1935 |
| 2,007,076 | Cohen et al. | July 2, 1935 |
| 2,039,812 | Leib et al. | May 5, 1936 |
| 2,082,347 | Leib et al. | June 1, 1937 |
| 2,204,628 | Sorensen | June 18, 1940 |
| 2,216,707 | George | Oct. 1, 1940 |
| 2,257,320 | Williams | Sept. 30, 1941 |
| 2,364,748 | Norton | Dec. 12, 1944 |
| 2,365,949 | Greene | Dec. 26, 1944 |
| 2,432,294 | Dimmer | Dec. 9, 1947 |

FOREIGN PATENTS

| Number | Country | Date |
|---|---|---|
| 317,006 | Great Britain | May 1, 1930 |
| 18,166/29 | Australia | Feb. 11, 1930 |